United States Patent
Al-Aqeeli et al.

(10) Patent No.: US 10,106,461 B2
(45) Date of Patent: *Oct. 23, 2018

(54) MASONRY BLOCKS

(71) Applicant: King Fahd University of Petroleum and Minerals, Dhahran (SA)

(72) Inventors: Nasser M. Al-Aqeeli, Dhahran (SA); Homoud M. Assehdi, Dhahran (SA); Mohammad Maslehuddin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,297

(22) Filed: May 2, 2018

(65) Prior Publication Data

US 2018/0251402 A1    Sep. 6, 2018

Related U.S. Application Data

(63) Continuation of application No. 15/495,332, filed on Apr. 24, 2017, which is a continuation of application No. 15/065,473, filed on Mar. 9, 2016, now Pat. No. 9,670,095, which is a continuation-in-part of application No. 14/253,978, filed on Apr. 16, 2014, now Pat. No. 9,382,160.

(51) Int. Cl.
| | |
|---|---|
| *C04B 18/22* | (2006.01) |
| *C04B 26/00* | (2006.01) |
| *C04B 26/02* | (2006.01) |
| *C04B 28/02* | (2006.01) |
| *C04B 111/00* | (2006.01) |
| *C04B 111/10* | (2006.01) |

(52) U.S. Cl.
CPC .......... *C04B 26/006* (2013.01); *C04B 26/02* (2013.01); *C04B 28/02* (2013.01); *C04B 2111/00646* (2013.01); *C04B 2111/1056* (2013.01)

(58) Field of Classification Search
CPC ...... C04B 18/22; C04B 24/42; C04B 20/0076
See application file for complete search history.

(56) References Cited

U.S. PATENT DOCUMENTS

| | | |
|---|---|---|
| 5,391,226 A | 2/1995 | Frankowski |
| 5,456,751 A | 10/1995 | Zandi |
| 7,727,327 B2 | 6/2010 | Glessner et al. |
| 2002/0040079 A1 | 4/2002 | Lee |
| 2004/0030053 A1 | 2/2004 | Izumoto |
| 2005/0182160 A1 | 8/2005 | Milani Nejad et al. |
| 2009/0314186 A1 | 12/2009 | Rodgers |
| 2010/0258751 A1 | 10/2010 | Shayer |
| 2012/0252910 A1 | 10/2012 | Yen |
| 2013/0160677 A1 | 6/2013 | Forth et al. |
| 2014/0042668 A1 | 2/2014 | Bennett |
| 2014/0308077 A1 | 10/2014 | Morbi |
| 2015/0299043 A1 | 10/2015 | Al-Qeeli |

FOREIGN PATENT DOCUMENTS

WO    WO 95/18775    7/1995

OTHER PUBLICATIONS

Parasivamurthy, P., et al., "Study of Crumb Rubber waste in Cement stabilized soil blocks", URL: https://www.researchgate.net/publication/237478145_Study_of_Crumb_Rubber_waste_in_Cement_stabilized_soil_blocks, Total 1 Page, (2007).

*Primary Examiner* — Karuna P Reddy
(74) *Attorney, Agent, or Firm* — Oblon, McClelland, Maier & Neustadt, L.L.P.

(57) ABSTRACT

Crumb Rubber augmented masonry blocks including cement, aggregate, water, and crumb rubber. Crumb rubber is extracted from scrape tires after being processed and then mixed in specified percentages with aggregate, cement and water. In the present disclosure sand, which is used in the formation of conventional blocks, is replaced with crumb rubber to produce a sand-free masonry block containing crumb rubber. The developed crumb rubber masonry blocks satisfied the ASTM non-load bearing requirements in addition to satisfying the water absorption test.

9 Claims, 1 Drawing Sheet

MASONRY BLOCKS

CROSS REFERENCE TO RELATED APPLICATIONS

This application is a Continuation of Ser. No. 15/495,332, now allowed, having a filing date of Apr. 24, 2017, which is a continuation of Ser. No. 15/065,473, now U.S. Pat. No. 9,670,095, having a filing date of Mar. 9, 2016, which is a Continuation-in-Part (CIP) of, and thus claims the benefits of U.S. application Ser. No. 14/253,978, now U.S. Pat. No. 9,382,160 filed Apr. 16, 2014, incorporated herein by reference in its entirety.

BACKGROUND OF THE INVENTION

Technical Field

The present invention relates to a masonry block in which crumb rubber material replaces sand in a masonry block comprising cement, aggregate, crumb rubber and water.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A search for innovative, environmentally friendly and ready-to-use building composites that combine higher efficiency and quality in the building process with improved thermal resistance has been ongoing. This has set increased demands on the both thermal and mechanical (thermo-mechanical) performances of new building products integrated with various plasters, foils, particles and rubbers. The large demand on building material industry has resulted from the increasing population, leading to a chronic shortage of building materials. The engineers have then been challenged to convert the industrial wastes to useful building and construction materials. Accumulation of unmanaged wastes is one of today's significant environmental concerns, especially in developing countries. Recycling of such wastes as building materials appears to be a viable solution not only to such pollution problem but also to the problem of the economical design of buildings. The increase in the popularity of using environmentally friendly, low cost and lightweight construction materials in building industry brings the need for searching more innovative, flexible and versatile composites. The most important aspects of innovation might be in the development of integrated insulation products such as the insulated, reinforced concretes, two or three-way precast sandwich wall panels, and rubberized concretes. Part of this interest is to establish the thermal performance of the alternative systems and products. Accurate thermal characteristics are required to guide product development and manufacturing. Methods and data exist for dealing with the common building walls and insulations, but new systems and products are generally lacking such data.

One of the new and popular products in this sense is modified cementitious composites with scrap tire rubber. Use of rubber from scrap tires in cement concrete mixtures can result in large benefits, like lower density, increased toughness and ductility, higher impact resistance, and more efficient heat and sound insulation. The use of recycled tire rubber also helps alleviate disposal problems and address the growing public concern about the need to preserve natural sand and aggregates.

Accumulations of discarded waste tires have been a major concern because of waste rubber is not easily biodegradable even after a long-period. Landfill treatment and unmanaged waste tires represent an environmental and health risk through fire hazard and as a breeding ground for disease-carrying mosquitoes. The alternatives are thus oriented toward materials and energy recovery.

A brick is the most basic building material for construction of low cost houses and apartments. Conventional types of brick are made from burnt clay and a significant quantity of fuel is consumed during its production.

Crumb rubber is produced by stepwise grinding of used tires. The crumb rubber can be used in different industries such as rubberized asphalt, mats production, and play ground athletic fields. Production of crumb rubber composites will open up a new market for crumb rubber.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

According to a first aspect, the present disclosure relates to a masonry block involving i) 20-30 wt % cement, ii) 50-60 wt % of an aggregate, which is not crumb rubber, iii) 1-10 wt % water, and iv) 10-20 wt % crumb rubber relative to the total weight of the masonry block. The crumb rubber present in the masonry block is in the form of coarse particles having a particle size of 1.5-5 mm, fine particles having a particle size of 50-250 µm, or a mixture of the coarse particles and the fine particles.

In one embodiment, the crumb rubber is in the form of coarse particles having a particle size of 1.5-5 mm.

In one embodiment, the crumb rubber is in the form of fine particles having a particle size of 50-250 µm. In one embodiment, the fine particles have a particle size of 100-148 µm.

In one embodiment, the mixture of the coarse particles and fine particles is present.

In one embodiment, a ratio of the coarse particles to the fine particles ranges from 2:1 to 1:2.

In one embodiment, the ratio of the coarse particles to the fine particles is about 1:1.

In one embodiment, the masonry block has a unit weight of 1000-1250 kg/m$^3$.

In one embodiment, the masonry block has a water absorption of 6.0-9.0% as determined by ASTM C 642.

In one embodiment, the aggregate is a crushed recycled concrete material.

In one embodiment, no aggregate, filler, or additive which comprises a group 13 element is present in the masonry block. In one embodiment, the group 13 element is boron.

In one embodiment, the crumb rubber is silanized crumb rubber obtained by treating crumb rubber with a silanizing agent selected from the group consisting of an aminosilane, a glycidoxysilane, and a mercaptosilane. In one embodiment, the aminosilane is selected from the group consisting of (3-aminopropyl)-diethoxy-methylsilane, (3-aminopropyl)-dimethyl-ethoxysilane, and (3-aminopropyl)-trimethoxysilane. In one embodiment, the glycidosilane is (3-glycidoxypropyl)-dimethyl-ethoxysilane. In one embodiment, the mercaptosilane is (3-mercaptopropyl)-trimethoxysilane or (3-mercaptopropyl)-methyl-dimethoxysilane.

In one embodiment, the crumb rubber is carboxylic acid surface modified crumb rubber obtained by treating crumb rubber with hydrogen peroxide.

In one embodiment, the masonry block has a wt % of crumb rubber ranging from 12 to 18%, relative to the total weight of the masonry block.

In one embodiment, the masonry block consists of the cement, the aggregate, the water and the crumb rubber.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
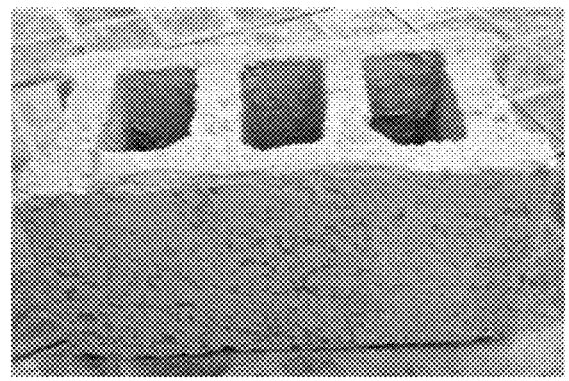
FIG. 1 illustrates a conventional masonry block.

Embodiments of the present disclosure will now be described more fully hereinafter with reference to the accompanying drawings, in which some, but not all embodiments of the disclosure are shown.

One embodiment of the disclosure describes Crumb Rubber (CR) augmented Masonry Blocks. In one embodiment, crumb rubber is obtained from scrap tires after being processed. The crumb rubber is then mixed in specified percentages with aggregate particles, cement and water. The conventional processing of Masonry blocks includes mixing aggregate, cement water, and 15% of sand. The sand is typically about 10-20% of the masonry block. Preferably, about 15% of the conventional masonry block is sand. Sand is a naturally occurring granular material composed of finely divided rock and mineral particles. The composition of sand may vary depending on the local rock sources and conditions, but the most common constituent of sand in inland settings includes $SiO_2$ in the form of quartz. Sand is in particulate form, e.g., grains having a diameter of from 0.0625 mm or less to about 2 mm.

Any type of cement or cement containing material may be used in any of the embodiments disclosed herein. For example, cement may include type I, Type Ia, type II, type IIa, type III, type IIIa, type IV and type V Portland cements (using either the ASTM CI50 standard or the European EN-197 standard), hydraulic cements, non-hydraulic cements, Portland flyash cement, Portland Pozzolan cement, Portland silica fume cement, masonry Cements, mortars, EMC cements, stuccos, plastic cements, expansive cements, White blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or Pozzolana mortar.

In one embodiment $SiO_2$ may be present in cement. Cement may include $SiO_2$-containing materials including but not limited to belite ($2CaO.SiO_2$), alite ($3CaO.SiO_2$), celite ($3CaO.Al_2O_3$), or brownmillerite ($4CaO.Al_2O_3.Fe_2O_3$) commonly found in sand-free cement.

In one embodiment the masonry blocks are made by mixing cement with crumb rubber in the absence of sand. In another embodiment the masonry blocks are made with cement containing sand and mixing the cement with crumb rubber. Preferably no sand is present as an aggregate component in the masonry block.

In the present disclosure, sand is replaced with crumb rubber to form a masonry block comprising cement, an aggregate, water (which may be in reacted form after curing), and crumb rubber. In one embodiment, the masonry block consists of cement, an aggregate, water, and crumb rubber.

The crumb rubber-augmented masonry blocks may include a wt % of cement in the range of 20-30%, or 21-29%, or 22-28%, or 23-27%, or 24-26%, or 25%, relative to the total weight of the masonry block. The crumb rubber-augmented masonry blocks may include a wt % of aggregate (which is not crumb rubber) in the range of 50-60%, or 51-59%, or 52-58%, or 53-57%, or 54-56%, or 55% relative to the total weight of the masonry block. The crumb rubber-augmented masonry blocks may include a wt % of water in the range of 1-10%, or 2-9%, or 3-8%, or 4-7%, or 5% relative to the total weight of the masonry block. The crumb rubber-augmented masonry blocks may include a wt % of crumb rubber in the range of 10-20%, or 11-19%, or 12-18%, or 13-17%, or 14-16%, or 15% relative to the total weight of the masonry block. Preferably, the crumb rubber augmented masonry block may have a wt % composition that includes 25% cement, 55% aggregate, 5% water, and 15% crumb rubber, or 30% cement, 55% aggregate, 5% water, and 10% crumb rubber, or 25% cement, 50% aggregate, 10% water, and 20% crumb rubber.

Crumb rubber is usually retrieved from recycled tires that are ground to about the size of a lump of coal. Thereafter these nuggets are ground down to about walnut size, with further grinding techniques bringing the walnut size bits of rubber down to mesh sizes to a lower mesh size. The crumb rubber may be in the form of coarse particles having a particle size of 1.5-5 mm, fine particles having a particle size of 50-250 μm, or a mixture of the coarse particles and the fine particles.

In one embodiment, the crumb rubber is in the form of coarse particles having a particle size of 1.5-5 mm, or 1.6-4.5 mm, or 1.7-4 mm, or 1.8-3.5 mm, or 1.9-3.2 mm, or 2-3 mm.

In one embodiment, the crumb rubber is in the form of fine particles having a particle size of 50-250 μm, or 60-240 μm, or 70-230 μm, or 80-220 μm, or 90-210 μm, or 100-200, or 100-180 μm, or 100-160 μm, or 100-150 μm, or 100-148 μm or, 100-140 μm. Preferably, the fine particles of crumb rubber have a mesh size of 65-100 mesh, 70-100 mesh, 75-95 mesh, 80-90 mesh, or an 80 mesh (177 μm) size.

In one embodiment, the mixture of the coarse particles and fine particles is present. A ratio of the coarse particles to the fine particles (by weight) may range from 2:1 to 1:2, or 1.9:1 to 1:1.9, or 1.8:1 to 1:1.8, or 1.7:1 to 1:1.7, or 1.6:1 to 1:1.6, or 1.5:1 to 1:1.5, or 1.4:1 to 1:1.4, or 1.3:1 to 1:1.3, or 1.2:1 to 1:1.2, or 1.1:1 to 1:1.1, or about 1:1.

In one embodiment, the crumb rubber particles of the present disclosure are treated with a surface treatment agent such as hydrogen peroxide to form treated particles having more carboxylic sites than untreated particles. The functional groups in the mixture containing water, aggregate, and cement then interact with the carboxylic sites, thereby causing the treated crumb rubber particles to contact with and be suspended in the mixture to a much greater degree than untreated particles.

Preferably, the crumb rubber particles are as small as possible so that they are most easily suspended in the mixture. The particles can be treated by mixing them with hydrogen peroxide at a temperature of about 65-85 degrees Centigrade while stirring for about 20 to 30 minutes to produce a freely-flowing powder. Preferably, the amount of hydrogen peroxide used is 0.035-0.040 milli-moles of peroxide per gram of mixture.

In another embodiment of the disclosure, the crumb rubber may also be compressed at high pressure at the presence of a specialized urethane, sodium silicate or any other acceptable glues. Preferably, the crumb rubber is compressed at a high pressure in the presence of a sodium silicate. In one embodiment, the applied pressure is stepped until the crumb rubber is flowable by first applying 1600 PSI and then in 15 second intervals stepping up the pressure by 500 PSI until the pressure reaches 3600 PSI.

In another embodiment the crumb rubber can be treated with a silanizing agent including but not limited to aminosilanes, glycidoxysilanes, and mercaptosilanes. Such aminosilanes include but are not limited to (3-aminopropyl)-diethoxy-methylsilane, (3-aminopropyl)-dimethylethoxysilane, and (3-aminopropyl)-trimethoxysilane. Such glycidoxysilanes include but are not limited to (3-glycidoxypropyl)-dimethyl-ethoxysilane. Such mercaptosilanes include but are not limited to (3-mercaptopropyl)-trimethoxysilane and (3-mercaptopropyl)-methyl-dimethoxysilane. The organofunctional alkoxysilane group of the silanizing agent interacts with the hydroxyl groups of the crumb rubber to displace the alkoxy groups attached to the silane molecule. A crumb rubber matrix containing the silanized crumb rubber is formed.

Exemplary aggregates include crushed recycled concrete, gravel, rocks, natural soil, quarried crushed mineral aggregates from igneous, metamorphic or sedimentary rocks, including unused and waste aggregates from quarry operations, gravel, dredged aggregates, china clay stent, china clay wastes, natural stone, recycled bituminous pavements, recycled concrete pavements, reclaimed road base and sub-base materials, crushed bricks, construction and demolition wastes, waste/recycled flue gas ashes, crushed glass, slate waste, waste plastics, egg shells, sea shells, and mixtures thereof. In one embodiment, the aggregate is crushed recycled concrete. The crushed recycled concrete can be made by crushing, grinding, pulverizing, etc. any concrete material including concrete compositions that include sand as an aggregate, or more preferably concrete material from the present disclosure (i.e. cement, aggregate which does not include sand, water, crumb rubber).

In one embodiment, no aggregate, filler, or additive which comprises a group 13 element is present in the masonry block. In one embodiment, the group 13 element is boron. Examples of aggregates, fillers, or additives that contain boron include borosilicates, boric acid, boron carbide, boron containing fibers, boron containing fabrics, boron containing mesh, boron filaments, borax, boron oxide, ferro boron and borated stainless steel, colemanite, ulexite, kemite, tincal, boron nitride, borates, or mixtures or boron isotopes thereof.

In one embodiment, the masonry block has a unit weight of 1000-1250 kg/m$^3$, preferably 1020-1200 kg/m$^3$, preferably 1025-1150 kg/m$^3$. Conventional masonry blocks have a unit weight of around 1259-1260 kg/m$^3$, therefore, the masonry block of the present disclosure may have a unit weight (in kg/m$^3$) that is 10-20% lower than that of conventional concrete blocks, which can cause less weight to be placed on a building frame and less wear on any concrete handling machinery.

In one embodiment, the masonry block has a water absorption of 6.0-9.0%, or 6.5-8.98%, or 6.8-8.95%, or 6.9-8.93% as determined by ASTM C 642.

In one embodiment, the masonry block has a thermal conductivity of 0.3-0.58 W/m·k, preferably 0.34-0.56 W/m·k, preferably 0.36-0.54 W/m·k, preferably 0.4-0.52 W/m·k. Conventional masonry blocks have a thermal conductivity of 0.585 W/m·k, and therefore the masonry blocks of the present disclosure (i.e. with crumb rubber) have a lower thermal conductivity which may provide energy conservation in buildings employing the crumb rubber masonry blocks.

The weight of the crumb rubber augmented masonry block is in the range of 10-30 kg, preferably 11-20 kg, preferably 15-20 kg, preferably 12-18 kg, preferably 16-19 kg.

One embodiment includes a masonry block comprising crumb rubber, aggregate, cement, and water. In one embodiment, crumb rubber, cement, and aggregate are placed in a concrete mixer and dry mixed for a time period in the range of 30 seconds-10 minutes, 45 seconds-8 minutes, or 50 seconds-5 minutes. Preferably the crumb rubber, cement, and aggregate are dry mixed for 1 minute. Mixing the crumb rubber, cement, and aggregate forms a mixture in which the crumb rubber is homogenously dispersed. Following the dry mixing process, water is added to the mixture of crumb rubber, cement, and aggregate. The water is slowly poured into a mixer while the mixer turns the cement, crumb rubber, and aggregate for a time period in the range of 1-10 minutes, 2-8 minutes, or 3-6 minutes. Preferably the water is mixed into the mixture for a time period of 3 minutes.

The mixture of water, crumb rubber, cement, and aggregate is fed into a steel mould to create a masonry block shape. The fresh mix is compacted in the mould by using a steel rod. After setting into the mould, the mixture is air cured for a time period in the range of 1-10 hours, 2-8 hours, or 4-7 hours. Preferably the mixture is air cured in the mould for a time period of 6 hours and then removed from the mould, which results in a masonry block. The masonry block is then cured for a time period of 15-30 days in a cure tank filled with lime-saturated water at a temperature in the range of 20-30° C., 21-29° C. or 22-28° C. Preferably the masonry block sample is cured for a time period of 28 days in a cure tank filled with lime-saturated water at a temperature of 22° C.

In one embodiment, the crumb rubber is a thermoset or thermoplastic polymer in the form of recycled crumb rubber from automotive and truck scrap tires.

In another embodiment the CR augmented masonry blocks don't require new processing routes as the same route used for producing conventional blocks can be adopted.

In another embodiment the CR augmented masonry blocks satisfy the standard for utilization in construction industry.

In another embodiment the CR augmented masonry blocks contribute significantly in utilizing Crumb rubber which will be a motivation to stop burning car tires and start shredding them to obtain more CR for the utilization in such application.

It has been observed that there is a physiological barrier in the public to use products that are made out of CR (or waste tires, as they refer to it). This has hindered the utilization of CR in important applications such as flooring and play grounds. The present embodiment utilizes CR in products and applications that are not in direct contact with people in order to remove this limitation.

The scrapped tires cannot be considered a waste material since it contains the needed Crumb Rubber that could be utilized. It is a valuable product with ongoing expansion and growth in diversified markets. It is far better to remove tires from the waste stream, regardless of disposal method, than to allow the continuation of uncontrollable and disastrous waste tire stock fires throughout the world. The extracted materials can be used as well once CRs is being removed from the tires. The CR-augmented Masonry blocks described in the disclosure were able to pass the ASTM standards adopted for the utilization of Masonry blocks in non-loading applications in addition to water absorption.

Utilizing and recycling crumb rubber in industry will have a tremendous environmental impact since scrap tires are typically burned due to the lack of suitable utilization of the crumb rubber that is extracted from them.

The examples below are intended to further illustrate the masonry blocks, their characterization, and uses thereof, and are not intended to limit the scope of the claims.

EXAMPLES

A comparative analysis was carried out between conventional masonry blocks and those augmented with CR. The developed CR-blocks displayed a combination of properties that satisfied the ASTM non-load bearing requirements in addition to satisfying the water absorption test.

The current commercially available masonry blocks are composed of aggregate, cement, water and sand and they are being utilized heavily in the construction industry. In the present disclosure, sand is replaced with crumb rubber using the same processing route. The crumb-rubber augmented masonry block was evaluated for the performance of the Masonry blocks in conditions similar to the ones faced during their utilization in the construction industry. The conventional masonry blocks are composed of the following ingredients with the listed percentages as listed in Table 1:

TABLE 1

Percent Composition of Conventional Masonry Blocks

| Ingredient | Percentage |
| --- | --- |
| Cement | 25% |
| Aggregate | 55% |
| Water | 5% |
| Sand | 15% |

FIG. 1 depicts conventional masonry blocks which have an average weight of 20.150 kg.

Table 2 displays an example of a percent composition of a crumb-rubber augmented masonry block.

TABLE 2

Percent Composition of Crumb-Rubber Augmented Masonry Blocks

| Ingredient | Percentage |
| --- | --- |
| Cement | 25% |
| Aggregate | 55% |
| Water | 5% |
| Crumb Rubber | 15% |

Figure 2:
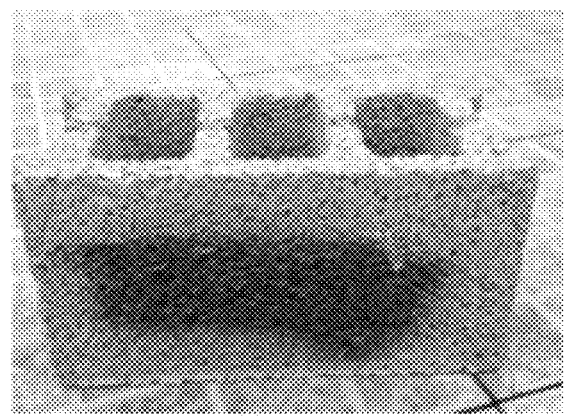
FIG. 2 illustrates a crumb-rubber augmented masonry block.

FIG. 2 displays the block fabricated with CR-augmentation which weighs on average 17.6 kg.

Different sizes of CR were added to the developed blocks. Table 3 shows the different sizes of CR and their composition.

TABLE 3

| Specimen designation | CR type | Size and composition (by weight) |
| --- | --- | --- |
| F | Fine grained | 100-200 µm (diameter) – 100% |
| C | Coarse grained | 2-3 mm (diameter) – 100% |
| FC | Mixture of Fine and Coarse grained | 50% fine (100-200 µm) + 50% coarse (2-3 mm) |

The nomenclature utilized to identify the types of blocks is as follows:

N—Normal Block

F—Block with fine crumb rubber (powder)

FC—Block with 50% fine crumb rubber (powder) and 50% coarse crumb rubber (mesh)

C—Block with coarse crumb rubber (mesh)

The unit weight of the conventional and developed CR masonry blocks are compared in Table 4.

TABLE 4

Unit weight of conventional and developed CR masonry blocks.

| Specimen designation | Oven dry weight, g | Length, mm | Width, mm | Height, mm | Unit Weight, kg/m³ |
| --- | --- | --- | --- | --- | --- |
| N | 20150.5 | 400 | 201 | 199 | 1259.44 |
| F | 16366.8 | 400 | 199 | 200 | 1028.07 |
| FC | 17868.8 | 400 | 199 | 199 | 1128.05 |
| C | 18592.3 | 400 | 200 | 203 | 1144.85 |

As indicated by the data in Table 4, the unit weight of the developed CR masonry blocks is less than that of the conventional masonry blocks. On an average the unit weight of the CR masonry blocks is 10 to 25% less than that of the conventional blocks. The decrease in the unit weight of the CR masonry blocks will entail a lower weight on the building frame and also less wear tear on the handling machinery.

Multiple tests were performed on the crumb rubber augmented masonry blocks in order to assess any improvement in their characteristics. Compressive tests (both load bearing and non-load bearing) were performed in addition to water absorption for both conventional and CR-augmented blocks.

TABLE 5

Compressive strength of conventional and the developed CR masonry blocks.

| Specimen type | Net area, mm² | Load, kN | Compressive strength, MPa | Average Compressive strength, MPa | ASTM C129 requirement for Non-load bearing blocks | ASTM C90 requirement for load-bearing blocks |
| --- | --- | --- | --- | --- | --- | --- |
| N | 47204 | 612.4 | 12.97 | 12.97 | 3.45 MPa if one specimen is tested and 4.14 MPa for average of three specimens | 11.7 MPa if one specimen is tested and 13.1 MPa for average of three specimens |
| F-1 | 46657 | 172.7 | 3.70 | 3.62 | | |
| F-2 | 46901 | 165.5 | 3.53 | | | |
| FC-1 | 47380 | 155.4 | 3.28 | 3.39 | | |
| FC-2 | 47653 | 166.4 | 3.49 | | | |
| C | 46804 | 331.5 | 7.08 | 7.08 | | |

The developed CR masonry blocks were tested to their compressive strength. The results of these tests are presented in Table 5. The compressive strength of the developed blocks are compared with that of the conventional blocks. Also, the ASTM requirements for non-loading and load-bearing blocks are presented in the last two columns of Table 5. As is evident from the data in Table 5, the compressive strength the conventional blocks was 12.97 MPa while it was in the range of 3.4 to 7.1 MPa in the CR masonry blocks. While the conventional blocks meet the ASTM requirements for both non-load bearing and load-bearing blocks, the developed blocks satisfy the requirements for the non-load bearing blocks. Since masonry blocks are utilized as non-load bearing units, the developed CR masonry blocks can be used beneficially utilized due to their low weight compared to the conventional masonry blocks.

TABLE 6

Water absorption of conventional and developed CR masonry blocks.

| Specimen type | Oven dry weight, g | SSD weight, g | Water absorption, % |
| --- | --- | --- | --- |
| N | 20150.5 | 21239.5 | 5.40 |
| F | 16366.8 | 17827.5 | 8.92 |
| FC | 17868.8 | 19130.3 | 7.06 |
| C | 18592.3 | 19884.6 | 6.95 |

The water absorption of conventional and developed CR masonry blocks is summarized in Table 6. The water absorption of the developed CR masonry blocks is in the range of 6.95 to 8.92% while it is 5.4% in the conventional blocks. Water absorption of both the blocks is within the acceptable limit particularly since they are generally coated with cement plaster or coal tar coating. The acceptable limit of water adsorption for the water adsorption test is less than 10% water adsorption under standard working conditions and a standard environment. The CR augmented masonry blocks have a higher water absorption capacity than the conventional masonry blocks.

TABLE 7

Thermal conductivity of the CR masonry blocks and conventional blocks.

| Specimen type | Dimensions, cm × cm × cm | Thickness, cm | Test temperature, ° C. | Thermal conductivity, W/m · K |
| --- | --- | --- | --- | --- |
| N—Normal block (without CR) | 40 × 20 × 20 | 20.09 | 33.3 | 0.585 |
| F—block with fine CR (powder) | 40 × 20 × 20 | 19.95 | 35.3 | 0.403 |
| FC—Block with (50% Fine + 50% Coarse CR) | 40 × 20 × 20 | 20.07 | 36.1 | 0.414 |
| C—Block with Coarse CR (mesh) | 40 × 20 × 20 | 20.04 | 35.0 | 0.512 |

The thermal conductivity of the developed CR masonry blocks is compared with that of the conventional blocks in Table 7. The thermal conductivity of conventional blocks is 0.585 W/m·K while it is in the range of 0.403 to 0.512 W/m·K in the developed CR masonry blocks. The decrease in the thermal conductivity of the developed Cr masonry blocks will be helpful in energy conservation in buildings.

It can be seen from the conducted tests that CR-augmented masonry blocks meet the requirement ASTM requirements for strength of non-load bearing blocks and exhibited reasonable improvement in thermal characteristics. The addition of different percentages and types of crumb rubber proved to alter the properties of the developed blocks.

The invention claimed is:

1. A sand-free non-load bearing masonry block, comprising:
    22-28 wt % cement;
    52-58 wt % of an aggregate, which is not crumb rubber;
    2-9 wt % water; and
    12-18 wt % crumb rubber relative to the total weight of the masonry block;
    wherein the crumb rubber is in the form of coarse particles having a particle size of 1.8-3.5 mm and fine particles having a particle size of 100-148 μm, and the crumb rubber is surface treated with hydrogen peroxide,
    wherein the masonry block has a thermal conductivity of 0.3-0.58 W/m·K.

2. The masonry block of claim 1, wherein a ratio of the coarse particles to the fine particles ranges from 2:1 to 1:2.

3. The masonry block of claim 2, wherein the ratio of the coarse particles to the fine particles is about 1:1.

4. The masonry block of claim 1, which has a unit weight of 1000-1250 kg/m³.

5. The masonry block of claim 1, wherein the masonry block has a water absorption of 6.0-9.0% as determined by ASTM C 642.

6. The masonry block of claim 1, wherein the aggregate is a crushed recycled concrete material.

7. The masonry block of claim 1, wherein no aggregate, filler, or additive which comprises a group 13 element is present in the masonry block.

8. The masonry block of claim 7, wherein the group 13 element is boron.

9. The masonry block of claim 1, which consists of the cement, the aggregate, the water and the crumb rubber.

* * * * *